United States Patent [19]
Assenheimer et al.

[11] 4,125,100
[45] Nov. 14, 1978

[54] METHOD AND APPARATUS FOR CONTROLLING THE OPERATING MIXTURE SUPPLIED TO AN INTERNAL COMBUSTION ENGINE

[75] Inventors: Jürgen Assenheimer, Vaihingen; Johannes Brettschneider, Ludwigsburg, both of Fed. Rep. of Germany

[73] Assignee: Robert Bosch GmbH, Stuttgart, Fed. Rep. of Germany

[21] Appl. No.: 779,102

[22] Filed: Mar. 18, 1977

[30] Foreign Application Priority Data

Mar. 18, 1976 [DE] Fed. Rep. of Germany ........ 2611409

[51] Int. Cl.$^2$ .................. F02M 23/04; F02B 33/00
[52] U.S. Cl. ........................ 123/124 R; 123/119 A; 123/119 D; 123/119 EC
[58] Field of Search ..... 123/119 A, 119 EC, 119 VC, 123/119 D, 119 DB, 124 R

[56] References Cited

U.S. PATENT DOCUMENTS

| | | | |
|---|---|---|---|
| 4,013,052 | 3/1977 | Masaki et al. | 123/119 A |
| 4,027,638 | 6/1977 | Moriya et al. | 123/119 A |
| 4,043,305 | 8/1977 | Henault | 123/124 R |
| 4,051,674 | 10/1977 | Suzuki | 123/119 A |

*Primary Examiner*—Wendell E. Burns
*Attorney, Agent, or Firm*—Edwin E. Greigg

[57] ABSTRACT

The process and apparatus disclosed herein is concerned with adjusting the composition of a combustible mixture supplied to an internal combustion engine by adding a supplementary quantity of air to the suction tube thereof. As disclosed the supplementary substance quantity is controlled as a dependent function of the fuel fed to the internal combustion engine and the fuel fed is gauged by way of the gas pressure in the exhaust system of the internal combustion engine.

7 Claims, 2 Drawing Figures

METHOD AND APPARATUS FOR CONTROLLING THE OPERATING MIXTURE SUPPLIED TO AN INTERNAL COMBUSTION ENGINE

BACKGROUND OF THE INVENTION

The invention relates primarily to a process for adjusting the composition of the combustible mixture supplied to an internal combustion engine by means of the admission of a supplementary quantity of air via a bypass line to the intake system of the internal combustion engine.

This broad concept has been disclosed heretofore, for example, by the German laid-open application No. 24 31 046. There a throttle device provided in an air bypass line is controlled by means of the throughput dependent suction tube subpressure in the most constricted cross-sectional area of the carburetor venturi, for the apportionment of the supplementary air introduced into the suction tube of an internal combustion engine to supplement the operating mixture delivered by the carburetor for the internal combustion engine. A regulating apparatus with which the pressure obtained at the venturi of the carburetor is modified is additionally superimposed on this air bypass quantity control for the regulation of the compositon of the operating mixture. However, this subpressure is not large enough in some of the operating regions of the internal combustion engine to achieve a reliable and accurate positioning of the throttle device as a dependent function of the air throughput or the operating mixture throughput of the internal combustion engine.

OBJECTS AND SUMMARY OF THE INVENTION

It is the principal object of the invention to develop a process as well as an apparatus to perform said process and with which a pre-control, acting reliably in all of the operating regions, of a supplementary operating substance quantity brought into the suction tube can be achieved under the most precise relationship possible versus the mixture quantity actually brought into the combustion chambers of the internal combustion engine, and with which a precise and rapid regulation of the composition of the mixture is thereby also attained. This object is achieved by the fact that the supplementary operating substance quantity is controlled as a dependent function of the gas throughput quantity of the internal combustion engine and that the gas throughput quantity is gauged by means of the gas pressure in the exhaust system of the internal combustion engine.

One advantageous embodiment of the invention consists in the fact that air serves as the supplementary operating substance.

The use of secondary air further yields the advantage, from the viewpoint of the regulation technique, that a deviation of the supplementary air quantity from a given set value can be corrected more rapidly than is the case for an analogous deviation of the fuel quantity. The inventive concept can be utilized both with internal combustion engines which include a customary carburetor as their mixture forming device as well as with internal combustion engines having an air metering apparatus which effects a correspondingly variable injection of fuel into the suction tube. A substantially higher control pressure, in absolute terms, is made possible within the concept of this invention, by means of the use of the exhaust pressure for the throughput dependent control of the cross-sectional area of the bypass than could be achieved by means of the heretofore utilized subpressure in the venturi of, for example, a carburetor.

Another advantageous concept disclosed by this invention resides in the fact that the gas throughput quantity is gauged by means of the gas pressure in the exhaust system and of the gas subpressure in a venturi in the intake system of the internal combustion engine. In this inventive concept the throughput dependent pressures are advantageously used in an additive manner for the throughput dependent positioning of the throttle device in the bypass line which fact yields a further increase in the accuracy of positioning due to the advantageous smaller resultant dimensions of the positioning members.

It is further object of the present invention to provide an apparatus for the implementation of the process disclosed herein. This object is attained in one case by providing a throttling device in an air bypass line which enters the intake manifold downstream of the mixture generator of the engine. The throttling device is attached to a positioning member which separates two control pressure chambers from one another and of which one communicates with the exhaust system, whereas the other communicates with the most constricted cross-sectional area of the venturi in the intake manifold of the engine and also contains a spring biasing the positioning member in opposition to the subpressure.

The invention will be better understood as well as further objects and advantages thereof become more apparent from the ensuring detailed description of several exemplary embodiments of the invention.

DESCRIPTION OF THE PREFERRED EMBODIMENTS

Figure 1:
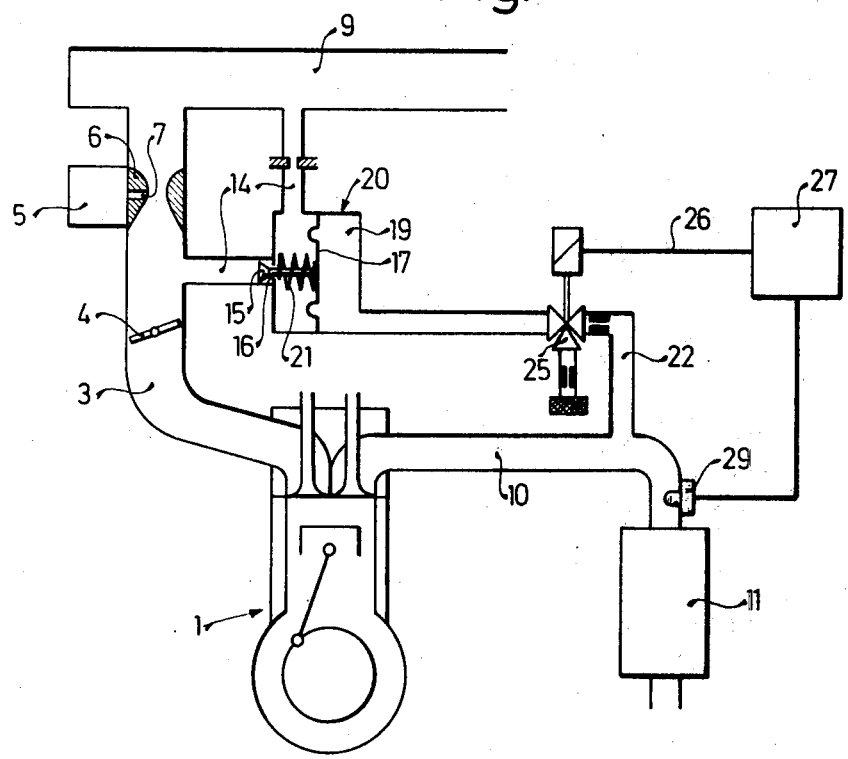
FIG. 1 is a schematic view of a first exemplary embodiment of the invention featuring an exhaust gas pressure dependent control of the cross-sectional area of the air bypass line.

Turning now to the drawings, FIG. 1 schematically depicts an internal combustion engine 1 having a suction tube 3 containing an arbitrarily positionable throttle flap 4. Upstream of the throttle flap 4 is provided a carburetor 5 of known constructional design which includes a venturi 6 provided with a fuel duct outlet 7. A customary air intake filter 9 is arranged adjacent to the intake side of the carburetor. The mixture that is transformed in the combustion chambers of the combustion engine is discharged via an exhaust system 10, of which the drawing depicts an exhaust pipe and a noise eliminating muffler 11.

An air bypass line 14 branches off the common filter 9 and bypasses the carburetor 5 and as shown in this case enters the suction tube upstream of the throttle flap 4. The air bypass line 14 can also be arranged to include its own air filter. The line 14 further contains a throttle device 15 which cooperates with a transit opening 16 of the air bypass line 14. The throttle device 15 has a coneshaped head on the shaft end and is fixedly attached to a positioning diaphragm 17. The positioning diaphragm 17 encloses a control pressure chamber 19 in a pressure cell 20 and is biased on its opposite side in the direction of the closure of the throttle device by means of a pressure spring 21 captively constrained in the pressure cell 20. A line 22 leads from the pressure chamber 19 to the exhaust system 10 upstream of a noise eliminating muffler module 11 and is also arranged to be upstream of any catalytic converter that is used. The line 22 contains an electromagnetically actuated three-way valve 25 by means of which the pressure chamber 19 can be connected both with the exhaust system 10 as well as with another and constant pressure means, such as, for example, with the ambient atmospheric pressure via the line 24.

The valve 25 is controlled by way of a line 26 by means of a regulator 27 which is arranged to gauge the signals from an exhaust gas measuring probe 29 that is situated in the exhaust system. The probe 29 can, for example, be a familiar oxygen measuring probe that reacts to partial pressures of oxygen in the exhaust gases.

OPERATION: EMBODIMENT 1

The first embodiment of this invention is arranged to function in the following manner:

When the combustion engine is in operation, a certain air stream quantity flows through the venturi 6 of the carburetor 5 in accordance with the r.p.m. of a given engine, and the position of the throttle flap 4 causes a subpressure within the venturi 6 relative to the ambient outside pressure. Corresponding to the given air quantity, fuel is brought in by way of the fuel duct outlet 7 by means of this subpressure in the usual manner. In the system disclosed in this application the carburetor is adjusted in such a way as to produce a relatively rich mixture, having an air factor of Lambda $<1$. Supplementary air flow is now conducted in parallel with the carburetor 5 via the air bypass line 14 to the mixture formed in the carburetor. The given quantity of this supplementary air is therein determined by the position of the throttle device 15, and should be regulated in such a way that a mixture that possesses a particular air-fuel composition is supplied to the combustion engine. This goal is achieved when the air bypass quantity can be kept proportional to the mixture throughput quantity. The throughput quantity is guaged by means of the exhaust gas pressure which comprises the control pressure in the control pressure chamber 19 corresponding to the throughput and positioning the throttle device 15 in opposition to the force of the spring 21. Upon a rising control pressure, or a rising throughput quantity through the combustion engine, the transit opening 16 in the air bypass line 14 is accordingly opened further, and a proportional supplementary air quantity is supplied to the combustion engine as a result of the pressure differential between the intake side in the region of the air filter 9 and the suction tube pressure.

Since the flow restrictions in the exhaust system of an internal combustion engine create an overpressure, for example, between the exhaust manifold and the first noise muffler cavity, which overpressure is a function of the square of the gas throughput, the exhaust gas overpressure is likewise a criterion for the gas quantity throughput of the internal combustion engine. Relative to the throughput dependent subpressure derived from within the venturi of the carburetor the exhaust gas pressure offers the advantage that pressures of an approximately threefold magnitude appear in the exhaust, so that here a substantially greater usable pressure range is made available for the pre-control of an air bypass quantity. According to measurements, pressures up to approximately 0.3 atmospheres gauge pressure are, for example, obtained without any special performance diminishing increase in the restrictions to the exiting flow, whereas at a venturi at the intake side of the internal combustion engine, only subpressures down to a vacuum approximately 0.1 atmospheres become available. In constrast to conditions at the intake side, a still utilizable pressure signal is present in the exhaust system even at idle, so that in this region the regulation of the supplementary air in the air bypass line 14 can advantageously take place as well. On the one hand, relatively smaller positioning members can be used for the alteration of the cross-sectional area of the air bypass line due to the higher control pressures. On the other hand, the controlling of the cross-sectional area becomes, in this case, more precise and functionally more reliable.

A regulation can now be superimposed on the previously described controlling of the supplementary air quantity with the aid of a regulator, with which an exact and definite air factor Lambda can be precisely maintained. This is of paramount importance with a view toward a diminution of the harmful constituents in the exhaust gases of the internal combustion engine.

The exemplary embodiment of this invention according to FIG. 1 incorporates such a regulator. The oxygen measuring probe 29 as provided within the exhaust system generates an abrupt voltage change in the region of Lambda $= 1$, which signal the regulator 27 processes to control the valve 25 in the line 22. In the depicted construction the three-way valve comprising the valve 25 can now be actuated, for example, by means of pulses of a predetermined frequency and of differing widths according to the given output signal of the oxygen measuring probe 29, so that the pressure mix reaching the control pressure chamber 19 is varied as a function of the exhaust gas pressure and the ambient atmospheric pressure. This procedure yields a corrective control over the given supplementary air quantity supplied in accordance with the gas quantity throughput. Instead of the regulator described herein, other suitable regulators can alternatively be superimposed on the pre-control of the supplementary air quantity. These regulators can also be driven by means of other parameters characterizing the operating behavior of the internal combustion engine. The relative dynamic stability of the internal combustion engine can, for example, also be gauged to manifest the required operating parameter.

In conjunction with a superimposed regulator, the described pre-control of the supplementary air quantity supplied in accordance with the gas throughput quantity through the internal combustion engine possesses the advantage that the regulator can response rapidly and accurately to the changing operating conditions of the internal combustion engine. The utilization of the embodiment of this invention is appropriate both for internal combustion engines operated with the customary carburetors as well as for internal combustion engines, in which the intake air quantity is gauged by means of an air quantity metering apparatus and fuel is injected in accordance with the given output signal of that air quantity metering apparatus. In the latter case, the air bypass line bypasses that air quantity metering apparatus.

In the exemplary embodiment of the invention according to FIG. 1, as explained earlier herein, the air bypass line 14 enters the suction tube upstream of the throttle flap 4. This fact entails the disadvantage that no noteworthy pressure difference is any longer available for the delivery of the secondary air particularly when the internal combustion engine is operating in an idle region. The same equipment can therefore also be constructed such that, as shown in the exemplary embodiment according to FIG. 2, the air bypass line 14' enters the suction tube downstream of the throttle flap. In this construction the required suction tube subpressure serving to propel the secondary air diminishes appreciably solely in the full-load state at a concurrent low engine r.p.m.

Figure 2:
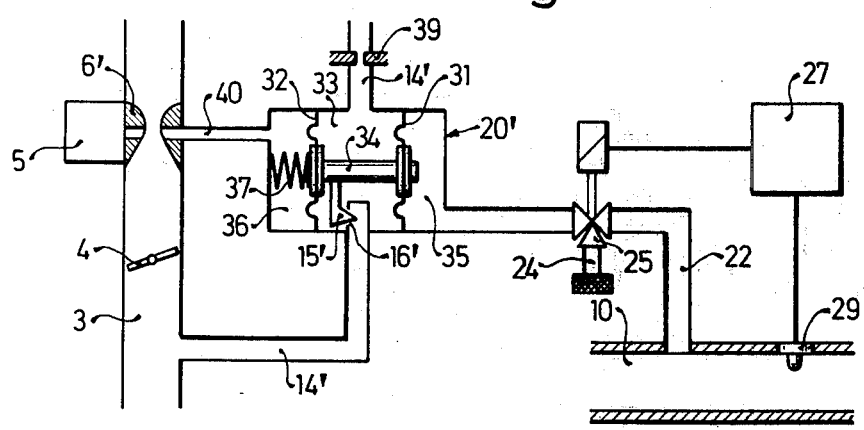
FIG. 2 is a schematic view of a second exemplary embodiment of the invention showing a suction tube subpressure dependent as well as an exhaust gas pressure dependent control of the cross-sectional area of an air bypass line.

Also, the exemplary embodiment according to FIG. 2 depicts a further concept of the invention in which the subpressure in the venturi of the suction tube is used in addition to the exhaust gas overpressure for the positioning of the throttle device in the air bypass line.

In the embodiment of FIG. 2 fuel is also supplied to the internal combustion engine by means of a carburetor 5 in accordance with the air quantity aspirated by way of the suction tube 3. The throttle flap 4 provided in the suction tube determines the given supplied mixture quantity under the functional consideration of the r.p.m. of the particular internal combustion engine. Also provided, as in the case of FIG. 1, is an air bypass line 14' which enters the suction tube downstream of the throttle flap 4. A variable transit opening 16' of the air bypass line 14' is located in a chamber 33 formed by a diaphragm 31 and a diaphragm 32 in a housing 20' and is controlled by means of a throttle device 15'. The throttle device 15' is fixedly attached to a stem 34 which joins the diaphragm 31 and 32 into an integral structure. At opposite sides of the housing 20', the diaphragm 31 encloses a control pressure chamber 35 and the diaphragm 32 encloses a control pressure chamber 36. The chamber 36 further contains a pressure spring 37 and the two diaphragms joined by means of the stem 34 are positionable in opposition to the force of the spring 37 according to the given pressures prevailing in the pressure chambers 35 and 36. The throttle device 15' varies the cross-sectional area of the transit opening 16'. The other component piece of the air bypass line 14', containing a throttle means 39 connects the chamber 33 to the air intake side.

The one control pressure chamber 35 is connected, as is also true of the control pressure chamber 19 according to the embodiment of FIG. 1, via a line 22 with the exhaust system 10. The line 22 contains the electromagnetic valve 25 which is controlled by means of the regulator 27 in accordance with the signal from the oxygen measuring probe 29 in the exhaust system.

The other control pressure chamber 36 is now connected by way of a line 40 with the most constricted cross-sectional area of the venturi 6' in the suction tube 3. This venturi can be, as is true in the earlier exemplary embodiment according to FIG. 1., the venturi of the carburetor.

OPERATION: EMBODIMENT 2

The apparatus according to FIG. 2 functions in the following manner:

Disregarding the regulator 27, the gas throughput dependent exhaust gas pressure is conducted by way of the line 22 to the control pressure chamber 35 and the diaphragm 31 is thus displaced in opposition to the force of the spring 37 acting through the interposition of the stem 34 and the diaphragm 32; the cross-sectional area of the transit opening 16' is thereby varied as a dependent function of the throughput. Acting in the same directional sense as the exhaust gas pressure, the throughput dependent subpressure from the venturi 6' reaches the control pressure chamber 36 and there similarly effects a displacement of the diaphragm 32 in opposition to the force of the spring 37 upon an increase of the throughput. The cross-sectional area of the transit opening 16' is simultaneously enlarged by means of the throttle device 15' via the stem 34 interposed between the diaphragm 31 and 32, respectively.

This arrangement provides the advantage that both the exhaust gas pressure as well as the suction tube subpressure are used for the pre-control of the supplementary air quantity. Since in this arrangement both pressures act in the same direction, one obtains the advantage of an additively increased positioning force. A suitable familiar regulating apparatus can also be superimposed on this presently described pre-control of the supplementary air quantity. The regulation interaction of the embodied example can take place both in the line 22 as well as in the line 40. Further measures as viewed from the standpoint of the regulation technique, such as the inclusion of throttles corresponding to the throttle 39 or the incorporation of supplementary volumetric capacity, also can be provided to improve the regulation behavior.

It is also contemplated to be within the concept of the invention that the interaction can, of course, also take place on the fuel side of the mixture, wherein, for example, a needle valve in the main jet of the carburetor or in a bypass of the main jet of the carburetor is manipulated by means of the forces transmitted by the diaphragms.

We claim:

1. In an apparatus for adjusting the composition of a combustible mixture supplied to an internal combustion engine, comprising: a suction tube connected to the engine; means defining a venturi constriction within the suction tube; an apparatus connected to the suction tube for determining the composition of the operating mixture of the engine; and an exhaust gas line connected to the engine, the improvement comprising: an air bypass line connected to the suction tube downstream of the apparatus for determining the composition of the operating mixture of the engine; positioning means; throttle means connected to the positioning means and extending into the air bypass line; an enclosure within which said positioning means is located to define therewith two control pressure chambers separated from each other; means connecting one of said control pressure chambers to the exhaust gas line; further means connecting the other of said control pressure chambers to the most constricted cross sectional area of the venturi defining means; and spring means located in said other of said control pressure chambers, whereby the positioning means has exerted against it the force of said spring means, and in opposition thereto, the subpressure from the most constricted cross sectional area of the venturi and the exhaust gas pressure.

2. The apparatus as defined in claim 1, wherein the positioning means comprises: a stem; and a pair of diaphragms spaced apart and joined together by said stem, with the throttle means being attached to said stem.

3. The apparatus as defined in claim 2, wherein a third chamber is defined by the enclosure and the two diaphragms between the two diaphragms, said third chamber being located in the bypass line with the throttle means controlling the cross sectional area of the bypass line into said third chamber.

4. The apparatus as defined in claim 2, wherein a third chamber is defined by the enclosure and the two diaphragms between the two diaphragms, said third chamber being located in the bypass line with the throttle means controlling the cross sectional area of the bypass line out of said third chamber.

5. In a process for adjusting the composition of a combustible mixture supplied to an internal combustion engine by means of the admission of a supplementary operating substance quantity, the engine having an intake system, a bypass line to the intake system and an exhaust system, the supplementary operating substance quantity being admitted via the bypass line to the intake system, the improvement comprising the steps of:

controlling the supplementary operating substance quantity as a dependent function of the gas throughput quantity of the engine by gauging the gas throughput quantity by means of the gas pressure in the exhaust system of the engine and additionally controlling the supplementary operating substance quantity by gauging the gas subpressure in a venturi in the intake system of the engine.

6. The process as defined in claim 5, wherein air serves as the supplementary operating substance quantity.

7. The process as defined in claim 5, further comprising the step of: regulating the gauging of gas throughput quantity as a function of an operating parameter of the engine.

* * * * *